United States Patent
Theivendran et al.

(10) Patent No.: US 8,980,097 B2
(45) Date of Patent: Mar. 17, 2015

(54) FILTER COMPRISING A HALOGEN RELEASE SYSTEM AND CHITOSAN

(75) Inventors: Sivarooban Theivendran, Reno, NV (US); James J. Kubinec, Reno, NV (US); Jeff Snelling, Reno, NV (US)

(73) Assignee: Water Security Corporation, Sparks, NV (US)

( * ) Notice: Subject to any disclaimer, the term of this patent is extended or adjusted under 35 U.S.C. 154(b) by 901 days.

(21) Appl. No.: 13/053,939

(22) Filed: Mar. 22, 2011

(65) Prior Publication Data

US 2011/0226706 A1 Sep. 22, 2011

Related U.S. Application Data

(60) Provisional application No. 61/316,202, filed on Mar. 22, 2010.

(51) Int. Cl.
| | | |
|---|---|---|
| *C02F 1/28* | (2006.01) | |
| *C02F 1/68* | (2006.01) | |
| *C02F 1/76* | (2006.01) | |
| *C02F 1/00* | (2006.01) | |

(52) U.S. Cl.
CPC ............... *C02F 1/002* (2013.01); *C02F 1/685* (2013.01); *C02F 1/766* (2013.01); *C02F 1/285* (2013.01); *C02F 2303/185* (2013.01); *C02F 1/283* (2013.01); *C02F 1/683* (2013.01); *C02F 1/76* (2013.01); *C02F 2303/04* (2013.01); *C02F 2305/08* (2013.01)
USPC ........... 210/668; 201/669; 201/753; 201/206; 201/287; 201/290

(58) Field of Classification Search
CPC ............ C02F 1/002; C02F 1/28; C02F 1/283; C02F 1/285; C02F 1/50; C02F 1/683; C02F 1/685; C02F 1/76; C02F 1/766; C02F 9/00; C02F 9/005; C02F 2303/02; C02F 2303/04; C02F 2303/18; C02F 2303/185; C02F 2305/08
USPC ......... 210/663, 668, 669, 683, 753, 754, 756, 210/758, 764, 198.1, 205, 206, 241, 287, 210/290
See application file for complete search history.

(56) References Cited

U.S. PATENT DOCUMENTS

| | | | |
|---|---|---|---|
| 4,275,194 A | 6/1981 | Kato et al. | |
| 4,643,831 A * | 2/1987 | Fletcher | 210/668 |

(Continued)

OTHER PUBLICATIONS

Z. Cao, et al., "N-Halamine-based chitosan: Preparation, characterization, and antimicrobial function." *Journal of Biomedical Materials Research Part A*, 2008, 85(1), 99-107.

(Continued)

*Primary Examiner* — Lucas Stelling
(74) *Attorney, Agent, or Firm* — K&L Gates LLP (57) ABSTRACT

A filter to provide potable water may generally comprise an inlet in fluid communication with an outlet, a halogen release system intermediate the inlet and the outlet, a filter material comprising chitosan or a derivative thereof intermediate the halogen release system and the outlet, and a scavenger barrier intermediate the filter material and the outlet. The filter material may comprise a chitosan-halogen complex. The filter material is capable of regeneration during periods of stagnation. The filter may have a Log reduction value for viruses of at least 4 and a Log reduction value for bacteria of at least 6.

32 Claims, 2 Drawing Sheets

(56) References Cited

U.S. PATENT DOCUMENTS

| | | | |
|---|---|---|---|
| 5,010,181 | A | 4/1991 | Coughlin |
| 5,204,452 | A | 4/1993 | Dingilian et al. |
| 5,336,415 | A | 8/1994 | Deans |
| 5,362,717 | A | 11/1994 | Dingilian et al. |
| 5,538,955 | A | 7/1996 | Rosa et al. |
| 5,543,056 | A | 8/1996 | Murcott et al. |
| 5,624,567 | A | 4/1997 | Colombo |
| 5,846,418 | A | 12/1998 | Thompson et al. |
| 6,270,754 | B1 | 8/2001 | Zhou et al. |
| 6,482,392 | B1 | 11/2002 | Zhou et al. |
| 6,521,243 | B2 | 2/2003 | Hassan |
| 6,794,346 | B2 | 9/2004 | Wick et al. |
| 7,157,009 | B2 | 1/2007 | Nichols et al. |
| 7,244,700 | B2 | 7/2007 | McKechnie |
| 7,331,355 | B2 | 2/2008 | Barnabas et al. |
| 7,441,665 | B2 | 10/2008 | Bridges et al. |
| 7,790,042 | B2 | 9/2010 | Nichols et al. |
| 2003/0104020 | A1 | 6/2003 | Davison et al. |
| 2004/0176477 | A1 | 9/2004 | Davison et al. |
| 2004/0195185 | A1 | 10/2004 | Macpherson et al. |
| 2005/0098506 | A1 | 5/2005 | Bridges et al. |
| 2005/0109709 | A1 | 5/2005 | Martin |
| 2005/0226938 | A1* | 10/2005 | Borbely et al. ............... 424/492 |
| 2005/0242043 | A1 | 11/2005 | Nichols et al. |
| 2007/0238698 | A1 | 10/2007 | Lin |
| 2008/0011662 | A1 | 1/2008 | Milosavljevic et al. |
| 2009/0008323 | A1 | 1/2009 | Bahm et al. |
| 2010/0006505 | A1 | 1/2010 | Smith et al. |
| 2010/0133194 | A1 | 6/2010 | Johnson et al. |
| 2010/0223716 | A1 | 9/2010 | Howard, Jr. |
| 2011/0000854 | A1 | 1/2011 | Nichols et al. |
| 2011/0006013 | A1 | 1/2011 | Nichols et al. |

OTHER PUBLICATIONS

Y.-M. Chen, et al., "Antibacterial Properties of Chitosan in Waterborne Pathogen." *Journal of Environmental Science and Health, Part A*, 2002, 37(7), 1379-1390.

U.S. Army Public Health Command, "Iodine Disinfection in the Use of Individual Water Purification Devices." Technical Information Paper #-31-005-0211, Prepared by S. H. Clarke, Mar. 2006, updated Jan. 2011.

K. T. Hwang, et al., "Controlling Molecular Weight and Degree of Deacetylation of Chitosan by Response Surface Methodlogy." *Journal of Agricultural and Food Chemistry*, 2002, 50, 1876-1882.

A. Venault, et al., "Elaboration of Chitosan/Activated Carbon Composites from the Removal of Organic Micropollutants from Water." *Environmental Technology*, 2008, 29(12), 1285-1296.

D. Raafat, et al., "Insights into the Mode of Action of Chitosan as an Antibacterial Compound." *Applied and Environmental Microbiology*, 2008, 74(12), 3764-3773.

Y. Shigeno, et al., "Functional Monomers and Polymers, 74 Physico-Chemical Study on the Chitosan-Iodine Complexes." *Die Angewandte Makromolekulare Chemie*, 1980, 91, 55-67 (Nr. 1397).

H. Yajima, et al., "Complex Formation of Chitosan with Iodine and Its Structure and Spectroscopic Properties—Molecular Assembly and Thermal Hysteresis Behavior." *International Journal of Thermophysics*, 2001, 22(4), 1265-1283.

U.S. Appl. No. 13/069,029, filed Mar. 22, 2011, Sivarooban et al.

PCT International Search Report for International Application No. PCT/US11/29386, mailed Jul. 8, 2011.

"Standard Methods for the Examination of Water and Wastewater," American Water Works Association, 21st edition (2005), Part 4000, pp. 70-71 and 97-99.

\* cited by examiner

FILTER COMPRISING A HALOGEN RELEASE SYSTEM AND CHITOSAN

CROSS REFERENCE TO RELATED APPLICATIONS

This application claims priority to U.S. Provisional Application No. 61/316,202, filed Mar. 22, 2010 the disclosure of which is incorporated by reference herein.

BACKGROUND

The water treatment systems described herein generally relate to filters comprising chitosan or derivatives thereof as well as methods of making and using the same.

Over one billion people lack access to reliable and sufficient quantities of safe or potable drinking water. Waterborne contaminants pose a critical health risk to the general public, including vulnerable populations, such as children, the elderly, and those afflicted with disease, if not removed from drinking water. An estimated six million people die each year, half of which are children under 5 years of age, from contaminated drinking water. The U.S. Environmental Protection Agency Science Advisory Board considers contaminated drinking water one of the public's greatest health risks.

Many people rely on groundwater as their only source of water. Groundwater was believed to be relatively pure due to its percolation through the topsoil; however, research has shown that up to 50% of the active groundwater sites in the United States test positive for waterborne contaminants. Waterborne contaminants may include microorganisms, including viruses, such as enteroviruses (polio, Coxsackie, echovirus, hepatitis), rotaviruses and other reoviruses, adenoviruses Norwalk-type agents, other microbes including fungi (including molds and yeasts), bacteria (including *salmonella, shigella, yersinia*, mycobacteria, *enterocolitica, E. coli, Campylobacter, Legionella, Cholera*), flagellates, amoebae, *Cryptosporidium, Giardia*, other protozoa, prions, proteins and nucleic acids, pesticides and other agrochemicals, including organic chemicals, inorganic chemicals, halogenated organic chemicals and other debris. Accordingly, the removal of waterborne contaminants may be necessary to provide potable drinking water for the general public; water for emergency use during natural disasters and terrorist attacks; water for recreational use, such as hiking and camping; and water for environments in which water must be recirculated, such as aircraft and spacecraft.

Therefore, more efficient water treatment systems are desirable.

SUMMARY

According to certain embodiments, more efficient water treatment systems are described.

According to certain embodiments, a filter to provide potable water may generally comprise an inlet in fluid communication with an outlet, a halogen release system intermediate the inlet and the outlet, a filter material comprising chitosan or a derivative thereof intermediate the halogen release system and the outlet, and a scavenger barrier intermediate the filter material and the outlet. The filter material may comprise a chitosan-halogen complex. The filter material may be capable of regeneration during periods of stagnation. The filter may have a Log reduction value for viruses of at least 4 and a Log reduction value for bacteria of at least 6.

According to certain embodiments, a method of treating water comprising at least one contaminant by a filter comprising an inlet in fluid communication with an outlet, a halogen release system intermediate the inlet and the outlet, a filter material comprising chitosan or a derivative thereof intermediate the halogen release system and the outlet, and a scavenger barrier intermediate the filter material and the outlet, the method may generally comprise flowing the water through the halogen release system, flowing the water through the filter material, and flowing the water through the scavenger barrier.

According to certain embodiments, the present disclosure provides a water treatment system to provide potable water. The system consists of an inlet in fluid communication with an outlet, and a halogenated chitosan intermediate to the inlet and the outlet.

DESCRIPTION OF THE DRAWINGS

The various embodiments described herein may be better understood by considering the following description in conjunction with the accompanying drawings.

DESCRIPTION OF CERTAIN EMBODIMENTS

A. Definitions

As generally used herein, the terms "consisting essentially of" and "consisting of" are embodied in the term "comprising".

As generally used herein, the articles "the", "a" and "an" refer to one or more of what is claimed or described.

As generally used herein, the terms "include" and "have" mean "comprising".

As generally used herein, the term "about" refers to an acceptable degree of error for the quantity measured, given the nature or precision of the measurements. Typical exemplary degrees of error may be within 20%, 10%, or 5% of a given value or range of values. Alternatively, and particularly in biological systems, the term "about" may mean values that are within an order of magnitude, potentially within 5-fold or 2-fold of a given value.

All numerical quantities stated herein are approximate unless stated otherwise, meaning that the term "about" may be inferred when not expressly stated. The numerical quantities disclosed herein are to be understood as not being strictly limited to the exact numerical values recited. Instead, unless stated otherwise, each numerical value is intended to mean both the recited value and a functionally equivalent range surrounding that value. At the very least, and not as an attempt to limit the application of the doctrine of equivalents to the scope of the claims, each numerical parameter should at least be construed in light of the number of reported significant digits and by applying ordinary rounding techniques. Notwithstanding the approximations of numerical quantities stated herein, the numerical quantities described in specific examples of actual measured values are reported as precisely as possible.

All numerical ranges stated herein include all sub-ranges subsumed therein. For example, a range of "1 to 10" is intended to include all sub-ranges between and including the recited minimum value of 1 and the recited maximum value of 10. Any maximum numerical limitation recited herein is intended to include all lower numerical limitations. Any minimum numerical limitation recited herein is intended to include all higher numerical limitations.

As generally used herein, "contaminant" may refer to any undesirable agent in a gas, vapor, or liquid fluid or solution. Contaminants may include, for example, but not limited to, heavy metals, such as lead, nickel, mercury, copper, etc.; polyaromatics; halogenated polyaromatics; minerals; vitamins; microorganisms or microbes (as well as reproductive forms of microorganisms, including cysts and spores) including viruses, such as enteroviruses (polio, Coxsackie, echovirus, hepatitis, calcivirus, astrovirus), rotaviruses and other reoviruses, adenoviruses Norwalk-type agents, Snow Mountain agent, fungi (for example, molds and yeasts); helminthes; bacteria (including *salmonella, shigella, yersinia*, fecal coliforms, mycobacteria, *enterocolitica, E. coli, Campylobacter, Serratia, Streptococcus, Legionella, Cholera*); flagellates; amoebae; *Cryptosporidium, Giardia*, other protozoa; prions; proteins and nucleic acids; pesticides and other agrochemicals including organic chemicals (such as acrylamide, alachlor, atrazine, benzene, benzopyrene, carbfuran, carbon tetrachloride, chlordane, chlorobenzene, 2,4-D, dalapon, diquat, o-dichlorobenzene, p-dichlorobenzene, 1,2-dichloroethane, 1,1-dichloroethylene, cis-1,2-dichloroethylene), dichloropropane, 1,2-dichloropropane, di(2-ethylhexyl)adipate, di(2-ethylhexyl)phthalate, dinoseb, dioxin, 1,2-diobromo-3-chloropropane, endothall, endrin, epichlorohydrin, ethylbenzene, ethylene dibromide, heptachlor, heptachlor epoxide, hexachlorobenzene, hexachlorocyclopentadiene, lindane, methoxychlor, oxamyl, polychlorinated biphenyls, pentachlorophenol, picloram, simazine, tetrachloroethylene, toluene, toxaphene, 2,4,5-TP, 1,2,4-trichlorobenzene, 1,1,1-trichloroethane, 1,1,2-trichloroethane, trichloroethylene, vinyl chloride, xylenes); halogenated organic chemicals; inorganic chemicals (such as antimony, arsenic, asbestos, barium, beryllium, cadmium, chromium, copper, cyanide, fluoride, lead, mercury, nitrate, selenium, and thalium); radioactive isotopes; and certain polyvalent dissolved salts; as well as other debris.

As generally used herein, the phrase "Log Removal" or "Log reduction value" refers to the $Log_{10}$, of the ratio of the level of contaminants (typically the number of microorganisms) in the influent to the level of contaminants (typically the number of microorganisms) in the effluent. For example, a Log 4 reduction in contaminants is >99.99% reduction in contaminants, whereas a Log 5 reduction in contaminants is >99.999% reduction in contaminants. In certain embodiments, the apparatuses and methods described herein may indicate a Log reduction value of at least a Log 4 to Log 5, Log 5 to Log 6, Log 6 to Log 7, Log 7 to Log 8, or Log 8 to Log 9.

As generally used herein, "reducing contaminants" refers to disarming one or more contaminants in the fluid, whether by physically or chemically killing, removing, reducing, or inactivating the contaminants or otherwise rendering the one or more contaminants harmless. Certain aspects may include removing one or more contaminants but specifically exclude one or more types, groups, categories or specifically identified contaminants as well. For example, in certain aspects, reducing contaminants may include one or more contaminants, or may include only one particular contaminant, or may specifically exclude one or more contaminants.

In the following description, certain details are set forth to provide a thorough understanding of various embodiments of the apparatuses and/or methods described herein. However, one of ordinary skill in the art will understand that the embodiments described herein may be practiced without these details. In other instances, well-known structures and methods associated with the apparatuses and/or methods described herein may not be shown or described in detail to avoid unnecessarily obscuring descriptions of the embodiments described herein. This disclosure describes various features, aspects, and advantages of various embodiments of water treatment systems as well as methods of making and using the same. It is understood, however, that this disclosure embraces numerous alternative embodiments that may be accomplished by combining any of the various features, aspects, and advantages of the various embodiments described herein in any combination or sub-combination that one of ordinary skill in the art may find useful.

B. Overview

In certain embodiments, a water treatment system may generally comprise a filter comprising at least one halogen release system, a filter material, and a scavenger barrier. In at least one embodiment, the water treatment system may generally comprise a point-of-use water treatment system comprising a halogen release system, a filter material comprising chitosan or a derivative thereof, and a halogen scavenger barrier. In certain embodiments, the point-of-use water treatment system may comprise a self-contained unit that may be used to treat water from untreated sources and/or a self-contained unit, such as a countertop, refrigerator or other unit, which may be used to treat tap water.

Certain embodiments described herein generally relate to reducing contaminants in a fluid. One of ordinary skill in the art would readily recognize that a fluid may comprise a liquid (such as water) and other fluids. For example, the fluid to be purified may be a bodily fluid (such as blood, lymph, urine, etc.), water in rivers, lakes, streams or the like, standing water or runoff, seawater, water for swimming pools or hot tubs, water or air for consumption in public locations (such as hotels, restaurants, aircraft or spacecraft, ships, trains, schools, hospitals, etc.), water for consumption in private locations (such as homes, apartment complexes, etc.), water for use in manufacturing computer or other sensitive components (such as silicon wafers), water for use in biological labs or fermentation labs, water or air for use in plant-growing operations (such as hydroponic or other greenhouses), wastewater treatment facilities (such as from mining, smelting, chemical manufacturing, dry cleaning or other industrial waste), or any other fluid that is desired to be purified. Certain embodiments described herein generally relate to reducing contaminants in a fluid to provide potable water. Certain embodiments specifically exclude municipal sewage and/or industrial wastewaters and runoff.

C. Halogen Release Systems

In certain embodiments, the filter may comprise a halogen release system. In certain embodiments, the halogen release system may be selected from the group consisting of halogenated resins, halogenated ion exchange resins, liquid halogens, gaseous halogens, halogen crystals, halogen compounds, halogens combined with other chemicals, and combinations thereof. In certain embodiments, the halogen release system may generally comprise at least one of chlorinated resins, iodinated resins, brominated resins, liquid chlorine, liquid bromine, iodine crystals, compound bromine, chlorine tablets, trichloroisocyanuric acid ("TCCA"), gaseous chlorine, chlorine dioxide, sodium hypochlorite, solid calcium hypochlorite, sodium chlorite, and sodium dichloroisocyanurate.

In certain embodiments, the halogen release system may comprise a chlorine tablet. Chorine tablets comprise a solid chlorine containing compound pressed into a tablet. In at least one embodiment, the chlorine tablet may comprise trichloroisocyanuric acid ("TCCA"). The tablet releases free chlorine when the tablet contacts water. For example, free chlorine (hypochlorous acid) is released into the flowing water when the tablet contacts flowing water. The concentration of chlorine in the flowing water may depend on the mass of the tablet. Tablets may have a mass from 0.25 grams to 200 grams. In at least one embodiment, a chlorine tablet comprising TCCA (46% chlorine) may have a mass of 65 grams. The concentration of chlorine in the flowing water may be maintained at a relatively constant value. The concentration of chlorine in the flowing water may be from 1 ppm to 10 ppm during the effective life of the tablet. For example, a chlorine tablet having a mass of 30 grams may treat 3000 L of water to provide a chlorine concentration of 10 ppm in the flowing water.

In certain embodiments, the halogen release system may comprise a halogenated resin. The halogenated resin may comprise halogens selected from the group consisting of chlorine, bromine, and iodine. The halogenated resin may be selected from the group consisting of chlorinated resins, brominated resins, and iodinated resins. In at least one embodiment, the halogenated resin may comprise a chlorinated resin. In at least one embodiment, the halogenated resin may comprise an iodinated resin. The halogenated resin may comprise a low-residual halogenated resin selected from the group consisting of chlorinated resins, brominated resins, and iodinated resins. In at least one embodiment, the low-residual halogenated resin may comprise a low-residual iodinated resin. Halogenated resins are described in U.S. Patent Application Pub. No. US 2008/0011662 to Milosavljevic et al.

In certain embodiments, the halogenated resin may comprise an iodinated resin comprising an iodinated base ion exchange resin of polyiodide anions bound to the quaternary amine fixed charges of a polymer. In at least one embodiment, the iodinated resin may comprise a Microbial Check Valve or MCV® Resin. The MCV® Resin comprises an iodinated strong base ion exchange resin of polyiodide anions bound to the quaternary amine fixed positive charges of a polystyrene-divinylbenzene copolymer. Polyiodide anions may be formed in the presence of excess iodine in an aqueous solution, and accordingly, bound polyiodide anions may release iodine into the aqueous solution for extended period of time. Water flowing through the MCV® Resin may achieve a microbial kill as well as residual iodine ranging between 0.5-4.0 mg/L, which may decrease the buildup of biofilm in storage and/or dispensing units. MCV® Resin may kill over 99.9999% of bacteria (Log reduction value ≥6) and 99.99% of viruses (Log reduction value ≥4) found in contaminated water. In at least one embodiment, the iodinated resin may comprise a regenerative MCV® Resin comprising a packed bed of crystalline elemental iodine to produce a saturated aqueous solution to replenish a depleted MCV® Resin.

As one of skill in the art will recognize, the amount of halogens released from the halogen release system may depend on various factors, including but not limited to, pH, temperature and flow rate, as well as the characteristics of the fluid (such as the level of contamination, including the amount of total dissolved solids or sediment, etc.).

D. Chitosan and Derivatives Thereof

In certain embodiments, the filter may comprise a filter material selected from the group consisting of chitin, chitin derivatives, chitosan, chitosan derivatives, and any combination thereof. Chitin is a polymer of β-1,4-(2-deoxy-2-acetamidoglucose) that may be extracted from the exoskeletons of insects and arthropods, such as crabs, lobsters and shrimps, and cell walls of fungi and yeast. Chitosan is a derivative of chitin. Chitosan is a polymer comprising 2-deoxy-2-acetamidoglucose monomers and 2-deoxy-2-aminoglucose monomers. Chitosan may be formed from chitin by hydrolyzing at least a portion of the 2-deoxy-2-acetamidoglucose monomeric units to 2-deoxy-2-aminoglucose monomeric units. Chitosan may be fully or partially deacetylated chitin. Chitosan comprises a polymer backbone comprising hydroxyl groups and amine groups. Chitosan may be soluble in aqueous acidic (pH<6.0) solutions.

In certain embodiments, the filter material may comprise chitosan or derivatives thereof. The chitosan or derivatives thereof may have a molecular weight in the range of from 5,000 Daltons to two million Daltons, such as from 50,000 Daltons to one million Daltons, or such as from 100,000 Daltons to 900,000 Daltons. In at least one embodiment, the chitosan or derivatives thereof may have a molecular weight from 100,000 Daltons to one million Daltons. The chitosan may have a percentage of deacetylation from 40% to 100%, such as from 60% to 95%, or such as from 70% to 90%. In at least one embodiment, the chitosan or derivatives thereof may have a percentage deacetylation of at least 75%. In at least one embodiment, the chitosan or derivatives thereof may have a percentage deacetylation of at least 85%. In at least one embodiment, the chitosan or derivative thereof may have a percentage deacetylation of at least 90%. In at least one embodiment, the chitosan or derivative thereof may have a percentage deacetylation from 90% to 95%. In at least one embodiment, the chitosan may have a molecular weight in the range of from 100,000 Daltons to one million Daltons and a percentage of deacetylation from 90% to ≥95%. In certain embodiments, the chitosan or derivative thereof may comprise a powder having a U.S. standard mesh size from 30 mesh to 230 mesh. In certain embodiments, the chitosan or derivative thereof may comprise a nanoparticle having a size from 10 nanometers to 100 nanometers. In certain embodiments, the chitosan or derivative thereof may have a bulk density from 0.1 g/cm$^3$ to 0.5 g/cm$^3$. The filter material may be selected from the group consisting of a liquid and a solid (e.g., a powder, gel, and/or paste).

In certain embodiments, the filter material may comprise chitosan derivatives. Chitosan derivatives may be prepared by modifying the polymer backbone, such as the hydroxyl groups and amine groups. The two hydroxyl groups may have different reactivity but may be functionalized by hydroxy active agents at high pH on either the acetylated monomers or deacetylated monomers. The amine groups of the deacetylated monomeric unit may be available for reaction where a significant number of the amines are deprotonated. These chemistries may provide chitosan compounds bearing different properties from the original chitosan polymer. The inhibitory activity of chitosan may be higher at pH 6.0 (pKa value of chitosan=6.2) than at pH 7.5, when most of the amino groups are in the free base form.

In certain embodiments, the filter material may comprise a mixture of chitosan or derivatives thereof and atoms (such as halogens), chemicals (natural or synthetic), and/or polymers. The mixture may be a homogenous composition or a heterogeneous composition. The polymers may include, but are not limited to, ion-exchange resins and charged derivatives of synthetic or natural polymers, such as cationic or anionic polymers. In at least one embodiment, the filter may comprise a mixture of the filter material comprising chitosan or derivative thereof and a halogen release system.

In certain embodiments, the filter material may comprise a chitosan-halogen complex. The halogen may be encapsulated in the lattice matrix of the chitosan or derivative thereof. The chitosan-halogen complex may be selected from the group consisting of a chitosan-chlorine complex, chitosan-bromine complex, chitosan-iodine complex, and any combination thereof.

Without wishing to be bound to any particular theory, it is believed that halogen in the chitosan-halogen complex is readily available in free from. The chitosan-halogen complex comprises the association of the halogen and chitosan or derivatives thereof. The chitosan-halogen complex generally involves a reversible association of molecules, atoms, or ions through weak chemical bonds. In at least one embodiment, the chitosan-halogen complex may comprise a chlorinated chitosan. The chlorine molecules in the chitosan-halogen complex may be readily available as a free chlorine form.

In certain embodiments, the chitosan-halogen complex may comprise an iodinated chitosan. The chitosan-iodine complex may include iodine and/or iodide complexed to the chitosan or derivative thereof. Suitable iodides include, but are not limited to, iodine-iodide complexes of the form (cation)$^+$(I$_3$)$^-$, wherein the cation is a cationic small molecule, such as a metal ion, e.g., potassium or sodium ions, or a cationic group attached to the chitosan, and I$_3$ is the tri-iodide anion. Examples of chitosan-iodine complexes are described in U.S. Pat. No. 4,275,194 to Kato et al., U.S. Pat. No. 5,204,452 to Dingilian, et al., U.S. Pat. No. 5,362,717 to Dingilian, et al., U.S. Pat. No. 5,336,415 to Deans, U.S. Pat. No. 5,538,955 to Rosa et al., and U.S. Pat. No. 6,521,243 to Hassan.

In at least one embodiment, the chitosan-iodine complex may comprise up to 50% of bound iodine by weight of the chitosan. In at least one embodiment, the chitosan-iodine complex may comprise up to 60-70% of bound iodine by weight of the chitosan. The concentration of the iodine may depend on the components of the composition. In certain embodiments, the concentration of the iodine may be the range of at least 0.05% by weight, at least 0.1%, and at least 0.5%, and ranging upward to 1%, 2%, 3%, 4%, 5% or more. Higher concentrations may be used when the iodine is stable against aggregation and evaporation during the product's shelf life.

In certain embodiments, a method for forming the chitosan-halogen complex may generally comprise contacting the chitosan with a halogenating agent. As a result of the reaction of the chitosan with the halogenating agent, at least a portion of the 2-deoxy-2-aminoglucose monomeric units may be converted to 2-monohalo aminoglucose monomeric units and/or 2,2-dihalo aminoglucose monomeric units to yield the chitosan-halogen complex. The halogenating agent may comprise any agent comprising a halogen, such as chlorine, bromine, and iodine, capable of donating a halogen atom. The halogenating agent may be at least one of sodium hypochlorite, calcium hypochlorite, chlorine, bromine, iodine, aqueous chlorine solutions, aqueous bromine solutions, aqueous iodine solutions, N-chlorosuccinimide, sodium hypobromite, pyridinium bromide perbromide, N-bromosuccinimide, and chloramine-T. Other suitable halogenating agents will be readily apparent to those skilled in the art.

In certain embodiments, a method for forming the chitosan-halogen complex may generally comprise contacting the chitosan or derivatives thereof with a solution of halogens in an aqueous solvent (e.g., water) and/or non-aqueous solvent (e.g., haloakanes, aliphatic and aromatic alcohols, aliphatic or aromatic ethers and ketones). The chitosan-halogen complex may be formed by contacting the chitosan or derivatives thereof with a solution of halogens in water for a period of time from 1 minute to 72 hours, at a pH from 6-8, and a temperature from 23-25° C. In at least one embodiment, the chitosan-halogen complex may be formed instantaneously by contacting the chitosan or derivatives thereof with a solution of halogens in water. The solution of halogens may comprise the effluent from the halogen release system. In at least one embodiment, the chitosan-chlorine complex may be formed in situ by contacting the chitosan or derivative thereof with a solution of chlorine in water. The solution of chlorine may comprise a chlorine tablet at least partially dissolved in water. In at least one embodiment, the chitosan-iodine complex may be formed in situ by contacting the chitosan or derivative thereof with a solution of iodine in water. The solution of iodine may comprise the effluent of the MCV® Resin.

E. Scavenger Barriers

Since halogens, and particularly chlorine and iodine, function efficiently as antimicrobial agents, it may be desirable to include one or more halogen release systems in the water treatment system. However, most halogens impart an unsavory flavor to the fluid, and it may be desirable to remove substantially all of the halogen after reducing the contaminants. In some instances, it may be desirable to retain a small amount of one or more halogens in the fluid to retard or inhibit microbial growth during storage, transport and/or dispensing of the fluid.

In certain embodiments, the water treatment system may comprise barriers that adsorb or absorb halogens, or react with or provide catalytic reaction sites for the conversion of halogens to an ionic form. These materials may be placed in the filter for the purpose of adsorbing, absorbing, or converting halogens to ionic form, or, materials that are placed in the filter for another purpose but to adsorb, absorb, or convert halogens to ionic form, are hereinafter collectively referred to as "halogen scavenger barriers."

In certain embodiments, halogen scavenger barriers may be placed downstream of halogen neutral barriers. In this manner, halogens remain in the fluid for an effective amount of time in order to maximize their antimicrobial effect before they are removed by halogen scavenger barriers or before being dispensed from the filter. The use of low residual halogen release systems may necessitate less free halogenated species being removed before dispensing the fluid. Indeed, it may be possible to allow the halogens to remain in the fluid if the levels are high enough for adequate microbial kill but low enough to result in safe levels of halogens in the fluid and an aesthetically pleasing taste and/or scent of the purified fluid. Therefore, in certain embodiments, a filter may require fewer or less effective halogen scavenger barriers, or none at all. In at least one embodiment, the halogen scavenger barriers may improve the smell, taste, and/or make the fluid suitable for drinking. In at least one embodiment, the halogen-scavenger barriers may improve the reduction of contaminants.

The halogen scavenger barriers may include any material(s) known or unknown in the art that may be used to absorb or adsorb at least one contaminant and/or at least one halogen and/or halide. In at least one embodiment, the halogen scavenger barrier may comprise chitosan or derivatives thereof. In certain embodiment, the scavenger barrier may be selected from the group consisting of carbon, activated carbon, and an ion exchange resin, such as a strong-base anion exchange resin. In at least one embodiment, the scavenger barrier may comprise granular activated carbon. Activated carbon may comprise any shape or form (for example, it may be in pellets, granular, or powder form). In at least one embodiment, the scavenger barrier may comprise an iodine scavenger resin. The scavenger barrier may comprise strong-base anion exchange resins, such as Iodosorb®, Water Security Corporation, Sparks, Nev., as described in U.S. Pat. No. 5,624,567. Briefly, Iodosorb®, sometimes referred to as an iodine scavenger resin, comprises trialkyl amine groups each comprising alkyl groups containing 3 to 8 carbon atoms which is capable of removing halogens, including iodine or iodide, from aqueous solutions.

F. Filters

Figure 1:
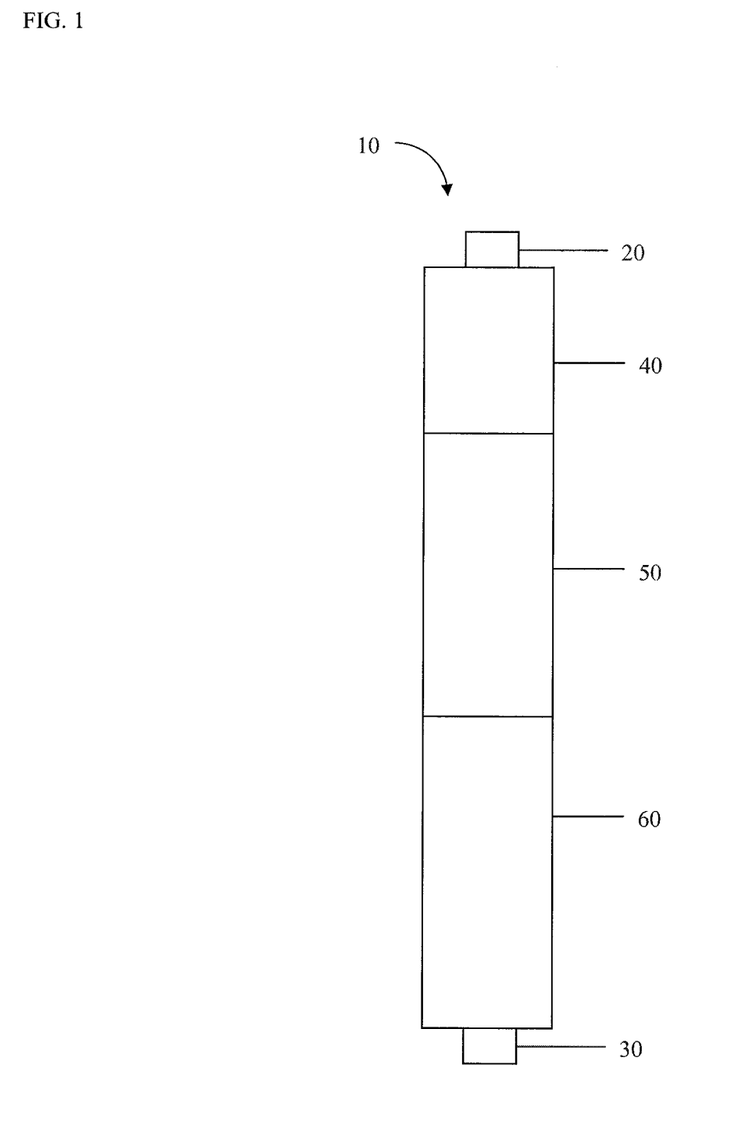
FIG. 1 includes an illustration of an embodiment of an apparatus described herein.

Referring to FIG. 1, a filter 10 may generally comprise an inlet 20 in fluid communication with an outlet 30, a halogen release system layer 40 intermediate the inlet 20 and the outlet 30, a filter material layer 50 comprising chitosan or a derivative thereof intermediate the halogen release system 40 and the outlet 30; and a scavenger barrier layer 60 intermediate the filter material 50 and the outlet 30. In at least one embodiment, the halogen release system 40 may comprise a chlorine tablet, the filter material 50 may comprise chitosan and/or halogenated chitosan, such as chlorinated chitosan, and the scavenger barrier 60 may comprise granular activated carbon. In at least one embodiment, the halogen release system 40 may comprise an iodinated resin, such as an MCV® Resin, the filter material 50 may comprise chitosan and/or halogenated chitosan, such as iodinated chitosan, and the scavenger barrier 60 may comprise an ion exchange resin, such as Iodosorb®. In at least one embodiment, the halogen release system 40 may comprise an iodinated resin, such as an MCV® Resin, the filter material 50 may comprise chitosan and/or halogenated chitosan, such as iodinated chitosan, and the scavenger barrier 60 may comprise an ion exchange resin, such as Iodosorb®, with the proviso that the scavenger barrier does not comprise carbon and activated carbon. In certain embodiments, the halogen release system and filter material comprise a homogeneous mixture intermediate the inlet 20 and the scavenger barrier 60. The filter material may be capable of regeneration during periods of stagnation.

In certain embodiments, the filter may comprise at least one chamber comprising a void space (not shown). In at least one embodiment, the chamber may be intermediate the inlet and the halogen release system. In at least one embodiment, the chamber may be intermediate the halogen release system and the outlet. In at least one embodiment, the chamber may be in direct fluid communication with the halogen release system. In at least one embodiment, the chamber may be intermediate the halogen release system and the filter material. In at least one embodiment, the chamber may be intermediate the filter material and the scavenger barrier. In at least one embodiment, the chamber may be intermediate the scavenger barrier and the outlet.

Chorine tablets may be comprised of a solid chlorine containing compound, e.g., trichloroisocyanuric acid (TCCA), pressed into a tablet. When the tablet contacts flowing water, the tablet may release free chlorine (hypochlorous acid) into the flowing water. The amount of chlorine released into the flowing water may be maintained at a relatively constant value, which may vary from 1 ppm to 10 ppm, during the tablet's effective life. A chlorine tablet comprising 30 g of chlorine may treat 3000 L of water to provide a concentration of 10 ppm chlorine, e.g., a TCCA (roughly 46% chlorine) tablet with a mass of about 65 gram. Tablets are commercially available with masses in the range from 0.25 to 200 gram. The filter may comprise sufficient granular activated carbon to reduce the chlorine in the treated water to a level below the odor and taste thresholds while simultaneously removing tastes and odors from organic compounds in the source water and disinfection byproducts.

In certain embodiments, the volume of the halogen release system may be less than the volume of at least one of the filter material and scavenger barrier. The volume of the halogen release system may be substantially less than the volume of at least one of the filter material and scavenger barrier. The volume of the filter material may be substantially equal to the volume of the scavenger barrier. In at least one embodiment, the volume of the iodinated resin may be 22 mL, the volume of the filter material may be 60 mL and the volume of the ion exchange resin may by 60 mL.

In certain embodiments, the filter may comprise a housing (not shown). The housing may comprise a longitudinal axis along the z-axis wherein at least one of the inlet, outlet, halogen release system, filter material, scavenger barrier, and chamber may be axially spaced along the longitudinal axis. The direction of fluid flow may be from the inlet towards the outlet along the longitudinal axis. The housing may comprise any suitable material, such as, for example, but not limited to, glass, metal, ceramic, plastic, and any combination thereof. In at least one embodiment, the housing material may not be permeable to aqueous and/or non-aqueous liquids. The housing may comprise any suitable shape, such as, for example, but not limited to, a polyhedron, a non-polyhedron, and any combination thereof. In at least one embodiment, the housing may comprise a generally cylindrical shape.

G. Methods of Use

Figure 2:
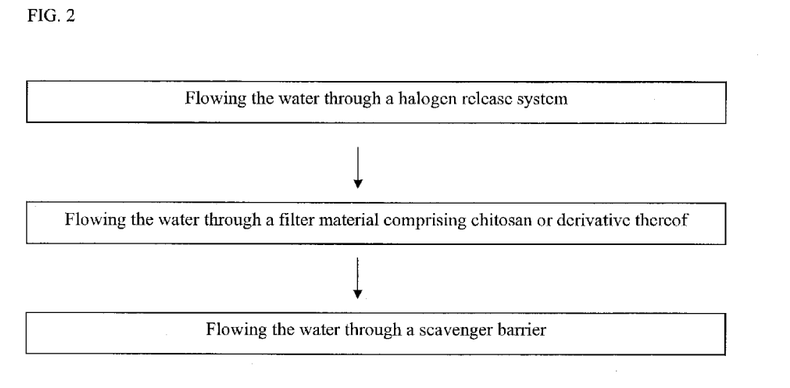
FIG. 2 includes a chart illustrating an embodiment of a method described herein.

Referring to FIG. 2, in certain embodiments, a method of treating water comprising at least one contaminant by a filter comprising an inlet in fluid communication with an outlet, a halogen release system intermediate the inlet and the outlet, a filter material comprising chitosan or a derivative thereof intermediate the halogen release system and the outlet, and a scavenger barrier intermediate the filter material and the outlet, the method may generally comprise flowing the water through the halogen release system, flowing the water through the filter material comprising chitosan or derivative thereof, and flowing the water through the scavenger barrier. The halogen release system may be any of the halogen release systems described herein. The filter material may be any of the filter materials described herein, including chitosan and derivatives thereof. The scavenger barrier may be any of the scavenger barriers described herein.

In certain embodiments, the method may comprise regenerating the chitosan or derivative thereof. In at least one embodiment, regenerating the chitosan or derivative thereof may comprise initiating a stagnation period. The stagnation period may be less than 7 days. In at least one embodiment, the stagnation period may be from 1 day to 5 days. In at least one embodiment, the stagnation period may be 5 days. In at least one embodiment, the stagnation period may be 3 days. In at least one embodiment, the stagnation period may be less than 1 day. In at least one embodiment, the stagnation period may be from 10 minutes to 12 hours. In at least one embodiment, the stagnation period may be from 3 days to 5 five days after reaching 50% to 75% filtration capacity of the filter.

A filter may have an initial Log reduction value that decreases during use. The stagnation period may provide sufficient time for the chitosan or derivative thereof to regenerate. The regenerated chitosan or derivative thereof may have an improved Log reduction value. In one embodiment, the Log reduction value of the filter after the stagnation period may be substantially equal to the initial Log reduction value.

In one embodiment, the Log reduction value of the filter after the stagnation period may be equal to the initial Log reduction value. The Log reduction value of the filter after the stagnation period may be 75% to 99% of the initial Log reduction value, such as 90% to 95% of the initial Log reduction value. In at least one embodiment, the Log reduction value of the filter after the stagnation period may be 92% of the initial Log reduction value. In at least one embodiment, the filter may have an initial Log reduction value for viruses of greater than 5 and a Log reduction value for viruses of greater than 5 after the stagnation period.

In certain embodiments, the water flowing from the scavenger barrier may be at least one of free of the filter material, substantially free of the filter material, and completely free of the filter material. As used herein, the term "substantially free" means that the material being discussed is present, if at all, as an incidental impurity. As used herein, the term "completely free" means that the material is not present at all. In certain embodiments, the water flowing from the scavenger barrier is at least one of free of the chitosan or derivatives thereof, substantially free of the chitosan or derivatives thereof, and completely free of the chitosan or derivatives thereof.

An influent may be introduced to the filter via the inlet. The influent may comprise an aqueous stream having a pH from 1 to 12, such as from 5 to 10, and such as from 6 to 8. In at least one embodiment, the influent may have a pH greater than 6. In at least one embodiment, the influent may have a pH of 7. In at least one embodiment, the influent may have a pH of 5 and a temperature of 4° C. The direction of fluid flow may be from the inlet to the outlet along the z-axis. The influent may contact the halogen release system. The halogen release system may release halogens into the fluid passing therethrough. The fluid may flow from the halogen release system to the filter material. The filter material may reduce contaminants and/or halogens in the fluid passing therethrough. The filter material may absorb and/or adsorb halogens from fluid passing therethrough. The filter material may release halogens into the fluid passing therethrough. The fluid may flow from the filter material to the scavenger barrier. The scavenger barrier may reduce contaminants and/or halogens in the fluid passing therethrough. The fluid may flow from the scavenger barrier to the outlet. The effluent from the outlet may comprise residual halogens, such as iodine or chlorine.

In certain embodiments, the filter material may have an empty bed contact time ("EBCT") of greater than 1 second. The EBCT is the volume of the filter material divided by the flow rate. In at least one embodiment, the EBCT may be between 1 second and 120 seconds, such as between 15 seconds and 60 seconds and between 30 seconds and 60 seconds. In certain embodiments, the EBCT of the chitosan or derivative thereof is 30 seconds to 120 seconds. In at least one embodiment, the EBCT of the chitosan or derivative thereof is 120 seconds.

In certain embodiments, the fluid contacting the filter material may have a fluid velocity less than 0.5 cm/s. In at least one embodiment, the fluid velocity may be between 0.3 cm/s and 0.5 cm/s. In at least one embodiment, the fluid velocity may be less than 0.3 cm/s. In at least one embodiment, the fluid velocity may be between 0.15 cm/s and 0.24 cm/s. In at least one embodiment, the fluid velocity may be less than 0.15 cm/s. In at least one embodiment, the fluid velocity may be greater than 0.5 cm/s.

H. Examples

The various embodiments described herein may be better understood when read in conjunction with the following representative examples. The following examples are included for purposes of illustration and not limitation.

A challenge experiment may be used to determine the ability of a water treatment system to reduce contaminants from a fluid. A challenge, or a known quantity of a selected microbiological contaminant, may be added to the influent. The virus MS2 coliphage (ATCC 15597-B1) may be chosen as the microbiological contaminant. The amount of the contaminant in the influent and effluent may be measured to determine the filtration capacity or microbial inactivation capacity of the water treatment system.

A challenge experiment of certain embodiments of the water treatment systems described herein was compared to other water treatment systems. A Log reduction value (Log PFU/mL) of 4 for MS2 in 3000 mL de-chlorinated tap water at room temperature was introduced to the water treatment system via the inlet and dispensed through the outlet. The influent and effluent were tested for MS2 coliphage before and after contact with the water treatment systems. The diameter of the water treatment system was 4.2 cm. The feed water flow rate was 120 mL/min. As generally used herein, the terms "ND" refers to not detectable or below the detection limit and "NA" refers to not applicable

Example 1

The results of a challenge experiment of a water treatment system comprising chitosan are shown in Table I. The chitosan was 22 grams of analytical grade chitosan from shrimp shells, ≥75% deacetylated, in 120 mL of water. The feed water volume was 0 L.

TABLE I

| Filter Material | MS2 Population (Log PFU/mL) | | |
|---|---|---|---|
| | Influent | Effluent | Log removal Individual |
| Chitosan | 5.38 | ND | 5.38 |

Example 2

The results of a challenge experiment of a water treatment system comprising MCV® Resin, chitosan, and Iodosorb® at time zero are shown in Table II. The chitosan was analytical grade chitosan from shrimp shells, ≥75% deacetylated. The volume of MCV® Resin was 22 mL, the mass of chitosan was 22 grams, which has a volume of about 120 mL when hydrated, and the volume of Iodosorb® was 120 mL. The feed water volume was 0 L.

TABLE II

| Feed volume (L) Time Zero (0) | MS2 Population (Log PFU/mL) | | | |
|---|---|---|---|---|
| | Influent | Effluent | Log removal Individual | Cumulative |
| MCV ® Resin | 5.38 | 2.70 | 2.68 | 2.68 |
| Chitosan | 2.70 | ND | 2.70 | 5.38 |
| Iodosorb ® | NA | NA | NA | 5.38 |

Example 3

The results of a challenge experiment of a water treatment system comprising iodinated chitosan are shown in Table III.

The chitosan was analytical grade chitosan from crab shells, ≥85% deacetylated. The iodinated chitosan was made in situ by contacting the chitosan with the iodine in the effluent from the MCV® Resin. The mass of chitosan was 22 grams, which has a volume of about 120 mL when hydrated. The feed water volume was 1500 L.

TABLE III

| | MS2 Population (Log PFU/mL) | | | |
| | | | Log removal | |
| Treatment | Influent | Effluent | Individual | Cumulative |
| --- | --- | --- | --- | --- |
| Chitosan | 5.40 | 1.52 | 3.88 | 3.88 |

Example 4

The results of a challenge experiment of a water treatment system comprising MCV® Resin and iodinated chitosan are shown in Table IV. The chitosan was analytical grade chitosan from crab shells, ≥85% deacetylated. The iodinated chitosan was made in situ by contacting the chitosan with the iodine in the effluent from the MCV® Resin. The volume of MCV® Resin was 22 mL and the mass of chitosan was 22 grams, which has a volume of about 120 mL when hydrated. The feed water volume was 1500 L. The EBCT for the chitosan was about 60 seconds.

TABLE IV

| | MS2 Population (Log PFU/mL) | | | |
| | | | Log removal | |
| Treatment | Influent | Effluent | Individual | Cumulative |
| --- | --- | --- | --- | --- |
| MCV ® Resin | 5.46 | 3.86 | 1.60 | 1.60 |
| Chitosan | 3.86 | 0.60 | 3.26 | 4.86 |

Example 5

The results of a challenge experiment of a water treatment system comprising MCV® Resin, chitosan, and Iodosorb® are shown in Table V. The chitosan was analytical grade chitosan from shrimp shells, ≥75% deacetylated. The volume of MCV® Resin was 22 mL, the mass of chitosan was 10 grams, which has a volume of about 60 mL when hydrated, and the volume of Iodosorb® was 60 mL. The feed water volume was 1500 L. The EBCT of the chitosan was about 30 seconds.

TABLE V

| | MS2 Population (Log PFU/mL) | | | |
| Feed Volume (L) | | | Log removal | |
| 1500 | Influent | Effluent | Individual | Cumulative |
| --- | --- | --- | --- | --- |
| MCV ® Resin | 5.36 | 3.43 | 1.93 | 1.93 |
| Chitosan | 3.43 | 2.00 | 1.43 | 3.36 |
| Iodosorb ® | 2.00 | 1.50 | 0.50 | 3.86 |

Example 6

The results of a challenge experiment of a water treatment system comprising MCV® Resin, chitosan, and Iodosorb® are shown in Table VI. The chitosan was industrial grade chitosan from crab shells, ≥90% deacetylated. The volume of MCV® Resin was 22 mL, the mass of chitosan was 20 grams, which has a volume of about 120 mL when hydrated. The feed water volume was 1800 L. The flow rate was 120 mL/min. The water temperature was 4° C. and the water has a pH of 5.

TABLE VI

| | MS2 Population (Log PFU/mL) | | | |
| Feed Volume (L) | | | Log removal | |
| 1800 | Influent | Effluent | Individual | Cumulative |
| --- | --- | --- | --- | --- |
| MCV ® Resin | 5.43 | 5.04 | 0.39 | 0.39 |
| Chitosan | 5.04 | 3.74 | 1.30 | 1.69 |

Example 7

The results of a challenge experiment of certain embodiments of a water treatment system described herein are compared to other water treatment systems. The water treatment system comprises MCV® Resin and chitosan. The chitosan was analytical grade chitosan from shrimp shells, ≥75% deacetylated. The iodinated chitosan was made in situ by contacting the chitosan with the iodine in the effluent from the MCV® Resin. The volume of MCV® Resin was 22 mL, the mass of chitosan was 22 grams, which has a volume of about 120 mL when hydrated. The feed water volume was 2700 L. The flow rate was 120 mL/min. The filter was subjected to a stagnation period of 5 days after 2100 L and a stagnation period of 3 days after 2700 L. Challenges were performed at the end of each stagnation period.

Figure 3:
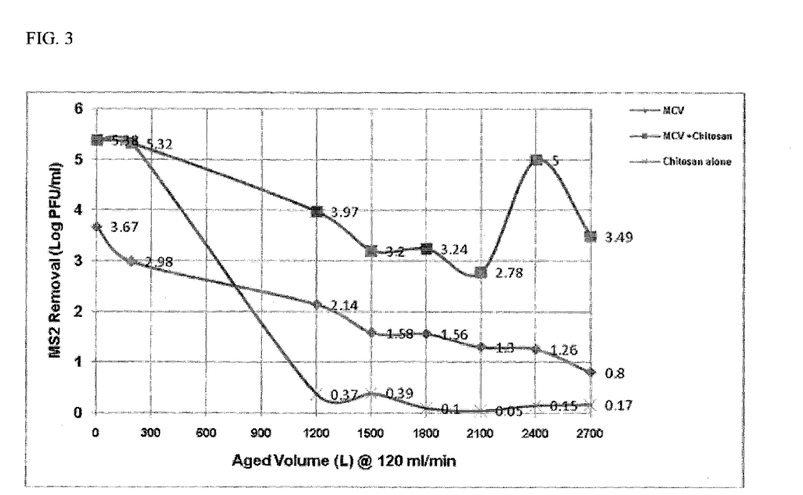
FIG. 3 includes a chart illustrating the Log reduction value of an embodiment of an apparatus described herein.

As shown in FIG. 3, a filter comprising a MCV® Resin had a Log reduction value >3 for the first couple hundred liters, but by 2100 L, decreased to a Log reduction value <1.5 (the "MCV" data series). A filter comprising chitosan had a Log reduction value >5 for the first few hundred liters, but by 2100 L, decreased to a Log reduction value <0.1 (the "Chitosan alone" data series). A filter comprising MCV® Resin and chitosan had a Log reduction value >2.5 up to 2100 L (the "MCV+Chitosan" data series). The Log reduction value of the "MCV+Chitosan" data series was greater than the sum of the Log reduction values for each of the "MCV" data series and "Chitosan alone" data series. After the first stagnation period of 5 days, the Log reduction value of the "MCV+Chitosan" data series increased from 2.78 Log Removal to 5 Log Removal. Without wishing to be bound to any particular theory, it is believed that the improved performance of the filter comprising MCV® Resin and chitosan may be attributable to the increased number of available binding sites provided by the chitosan for the contaminants, such as the virus MS2 coliphage. The stagnation period provides sufficient time for the residual iodine in the system to oxidize and remove the organic residuals that are attached to the binding sites. The stagnation period provides sufficient time for the chitosan to regenerate. Although stagnation periods of 5 days and 3 days were reported for a filter comprising 22 grams of chitosan, it is believed that stagnation periods from 10 minutes to 7 days may provide sufficient time for the chitosan to regenerate All documents cited herein are, in relevant part, incorporated herein by reference, but only to the extent that the incorporated material does not conflict with existing definitions, statements, or other documents set forth herein. To the extent that any meaning or definition of a term in this document conflicts with any meaning or definition of the same term in a document incorporated by reference, the meaning or definition assigned to that term in this document shall govern. The citation of any document is not to be construed as an admission that it is prior art with respect to this application.

While particular embodiments of water treatment systems have been illustrated and described, it would be obvious to those skilled in the art that various other changes and modifications can be made without departing from the spirit and scope of the invention. Those skilled in the art will recognize, or be able to ascertain using no more than routine experimentation, numerous equivalents to the specific apparatuses and methods described herein, including alternatives, variants, additions, deletions, modifications and substitutions. This disclosure including the appended claims is therefore intended to cover all such changes and modifications that are within the scope of this application.

What is claimed is:

1. A flow-through filter to provide potable water, the filter comprising:
    a) an inlet in fluid communication with an outlet;
    b) a halogen release system defining a first layer comprising iodine and located intermediate the inlet and the outlet;
    c) a filter material defining a second layer comprising chitosan or a derivative thereof located downstream from the halogen release system layer and intermediate the halogen release system layer and the outlet; and
    d) a scavenger barrier defining a third layer comprising halogen scavenger located downstream from the filter material layer and intermediate the filter material layer and the outlet.

2. The filter of claim 1, wherein the chitosan or derivative thereof has a molecular weight from 5,000 Daltons to two million Daltons.

3. The filter of claim 1, wherein the chitosan or derivative thereof has a molecular weight from 100,000 Daltons to one million Daltons.

4. The filter of claim 1, wherein the chitosan or derivative thereof has a percentage of deacetylation from 40% to 100%.

5. The filter of claim 1, wherein the chitosan or derivative thereof has a percentage of deacetylation from 90% to 95%.

6. The filter of claim 1, wherein the chitosan or derivative thereof comprises a powder having a U.S. standard mesh size from 30 mesh to 230 mesh.

7. The filter of claim 1, wherein the chitosan or derivative thereof comprises a nanoparticle having a size from 10 nanometers to 100 nanometers.

8. The filter of claim 1, wherein the filter material comprises an empty bed contact time from 30 seconds to 120 seconds.

9. The filter of claim 1, wherein the filter material comprises a chitosan-halogen complex.

10. The filter of claim 9, wherein the filter material comprises a chlorinated chitosan.

11. The filter of claim 9, wherein the filter material comprises an iodinated chitosan.

12. The filter of claim 1, wherein the halogen release system is selected from the group consisting of halogenated resins, halogenated ion exchange resins, liquid halogens, gaseous halogens, halogen crystals, halogen compounds and combinations thereof.

13. The filter of claim 1, wherein the halogen release system comprises an iodinated resin.

14. The filter of claim 1, wherein the scavenger barrier is selected from the group consisting of carbon, activated carbon, and a strong-base anion exchange resin.

15. The filter of claim 1, wherein the halogen release system comprises an iodinated resin, the filter material comprises chitosan, and the scavenger barrier comprises granular activated carbon.

16. The filter of claim 1, wherein the halogen release system comprises an iodinated resin, the filter material comprises chitosan, and the scavenger barrier comprises an iodine scavenger resin.

17. The filter of claim 1, wherein the filter has a Log reduction value for viruses of at least 4 and a Log reduction value for bacteria of at least 6.

18. The filter of claim 1, wherein the filter has an initial Log reduction value for viruses of greater than 5 and a Log reduction value for viruses of greater than 5 after a stagnation period.

19. The filter of claim 1, wherein the filter material has a Log reduction value for viruses of at least 4 and a Log reduction value for bacteria of at least 6 at a temperature of at least 4° C. and a pH of at least 5.

20. The filter of claim 1, wherein:
    the halogen release system layer comprises an iodinated resin; and
    the scavenger barrier layer comprises an anion exchange resin.

21. The filter of claim 1, wherein:
    the halogen release system layer comprises an iodinated resin;
    the filter material layer comprises a chlorinated chitosan; and
    the scavenger barrier layer comprises an anion exchange resin.

22. A method of treating water comprising at least one contaminant by a filter comprising an inlet in fluid communication with an outlet, a halogen release system defining a first layer comprising iodine intermediate the inlet and the outlet, a filter material defining a second layer comprising chitosan or a derivative thereof located downstream from the halogen release system layer and intermediate the halogen release system layer and the outlet, and a scavenger barrier defining a third layer comprising halogen scavenger located downstream from the filter material second layer and intermediate the filter material layer and the outlet, the method comprising:
    flowing the water through the halogen release system layer;
    flowing the water through the filter material layer; and
    flowing the water through the scavenger barrier layer.

23. The method of claim 22, comprising initiating a stagnation period to regenerate the chitosan or derivative thereof.

24. The method of claim 23, wherein the stagnation period is less than 7 days.

25. The method of claim 24, wherein the filter has an initial Log reduction value for viruses of greater than 5 and a Log reduction value for viruses of greater than 5 after the stagnation period.

26. The method of claim 22, wherein the water flowing from the scavenger barrier is at least one of free of the filter material, substantially free of the filter material, and completely free of the filter material.

27. The method of claim 22, wherein:
    the halogen release system layer comprises an iodinated resin; and
    the scavenger barrier layer comprises an anion exchange resin.

28. The method of claim 22, wherein:
    the halogen release system layer comprises an iodinated resin;

the filter material layer comprises a chlorinated chitosan; and the scavenger barrier layer comprises an anion exchange resin.

29. A flow-through water treatment system to provide potable water, the system comprising:
an inlet in fluid communication with an outlet;
an iodinated resin layer located intermediate the inlet and the outlet;
a halogenated chitosan layer located downstream from the iodinated resin layer and intermediate the iodinated resin layer and the outlet; and
a scavenger barrier layer comprising an anion exchange resin located downstream from the halogenated chitosan layer and intermediate the halogenated chitosan layer and the outlet.

30. The system of claim 29, wherein the halogenated chitosan is selected from the group consisting of chlorinated chitosan, brominated chitosan, iodinated chitosan, and combinations thereof.

31. The system of claim 29, wherein the halogenated chitosan is a chlorinated chitosan.

32. The system of claim 29, wherein the halogenated chitosan is a mixture of a halogenating agent and chitosan.

* * * * *